United States Patent

Kihira et al.

[11] Patent Number: 6,136,474
[45] Date of Patent: *Oct. 24, 2000

[54] METHOD FOR PRODUCING ANODE MATERIAL AND NON-AQUEOUS ELECTROLYTE CELL EMPLOYING SUCH MATERIALS

[75] Inventors: Toru Kihira; Eishi Endo; Shinichiro Yamada; Masafumi Ata; Yoshihisa Gonno; Kenichi Kitamura; Akinori Kita; Hiroshi Imoto, all of Kanagawa, Japan

[73] Assignee: Sony Chemicals Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/987,392

[22] Filed: Dec. 9, 1997

[51] Int. Cl.[7] .............................. H01M 4/96; H01M 4/58; H01M 6/18

[52] U.S. Cl. ..................... 429/231.8; 429/223; 429/224; 429/231.3; 429/231.4; 429/326

[58] Field of Search ..................................... 429/326, 327, 429/329–332, 223, 224, 231.3, 231.4, 231.8, 231.95

[56] References Cited

U.S. PATENT DOCUMENTS

| | | |
|---|---|---|
| 4,835,075 | 5/1989 | Fajima et al. . |
| 5,219,680 | 6/1993 | Fauteux . |
| 5,256,504 | 10/1993 | Okuno et al. . |
| 5,310,553 | 5/1994 | Simon et al. ............................ 429/212 |
| 5,510,212 | 4/1996 | Delnick et al. . |
| 5,561,005 | 10/1996 | Omaru et al. . |
| 5,576,121 | 11/1996 | Yamada et al. ......................... 429/220 |
| 5,591,545 | 1/1997 | Miyashita et al. . |
| 5,677,085 | 10/1997 | Zhang et al. . |
| 5,679,480 | 10/1997 | Takahashi et al. . |

*Primary Examiner*—Maria Nuzzolillo
*Assistant Examiner*—Tracy Dove
*Attorney, Agent, or Firm*—Hill & Simpson

[57] ABSTRACT

A non-aqueous electrolyte cell equipped with an anode made of a carbonaceous material capable of intercalating and deintercalating light metal ions and imparted with high capacity characteristics and favorable cyclic properties, wherein the carbonaceous material is obtained by irradiating, in a gaseous atmosphere, an electron beam accelerated in high vacuum. The anode made of a carbonaceous material is subjected to electron beam irradiation at a dose ranging from 300 kGy to 1000 kGy.

7 Claims, 14 Drawing Sheets

METHOD FOR PRODUCING ANODE MATERIAL AND NON-AQUEOUS ELECTROLYTE CELL EMPLOYING SUCH MATERIALS

BACKGROUND OF THE INVENTION

1. Field of the Invention

The present invention relates to a method for producing carbonaceous anode material capable of intercalating or deintercalating light metal ions such as lithium ions, to a carbonaceous anode material obtained by the method, and to a non-aqueous electrolyte cell using such material.

2. Prior Art

Compact portable electronic products such as camcorders, personal handyphone systems, laptop computers, etc., have been developed with recent advance in electronic technology, and hence, the development of a compact and light-weight secondary battery having high energy density for use as a portable power source is strongly demanded.

Recently, non-aqueous electrolyte cells using light metals such as lithium, sodium, or aluminum as charge carriers are attracting attention and active study is made thereon as batteries which fulfill the requirements above, because they can achieve higher energy density when compared with nickel-cadmium or lead batteries.

However, when a light metal such as metallic lithium is used as it is for the anode of a non-aqueous electrolyte cell, metallic lithium does not always form a uniform precipitate on the surface of the anode during the charging process (i.e., the process of precipitating metallic lithium), but sometimes forms a dendritic precipitate. When such dendrites are formed, they gradually grow with repeated recharging as to finally reach the cathode to possibly cause internal short circuit.

Accordingly, to prevent such light metal dendrites from forming, it is proposed not to use the light metals directly for the anodes, but to use them as dopants in a material capable of being doped and dedoped therewith. Concerning lithium ions, in particular, lithium-ion non-aqueous electrolyte cells equipped with anodes made of carbonaceous materials capable of intercalating or deintercalating lithium ions, such as natural graphite, artificial graphite, or non-graphitizable carbon materials, and being intercalated with carbon dopants, are now practically available. Such non-aqueous electrolyte cells boast superior safety and reliability, because the formation of dendrites is suppressed by incorporating light metals in non-metallic states.

OBJECT AND SUMMARY OF THE INVENTION

The use of a material capable of intercalating or deintercalating light metal ions for the anode greatly improves the safety and the reliability of a non-aqueous electrolyte cell. However, in the case of using a non-graphitizable carbon material, in particular, it is required to achieve higher level in energy density (i.e., improvement of capacity characteristics) by increasing the charging and discharging current efficiency.

Furthermore, in general, non-aqueous electrolyte cells suffer a decrease in cell capacity with repeated recharging (i.e., degradation of cyclic properties). Particularly, this degradation occurs more likely when highly crystalline graphite material is used, than when a non-graphitizable carbon material is employed. This is another point to be improved.

Accordingly, an object of the present invention is to overcome the aforementioned problems of prior art technology, and to implement a non-aqueous electrolyte cell having superior capacity characteristics and favorable cyclic properties, while yet employing an anode made of a carbonaceous material capable of intercalating or deintercalating light metal ions.

The present inventors have found that an anode material obtained by irradiating a carbonaceous material capable of intercalating or deintercalating light metal ions under a gaseous atmosphere with an electron beam accelerated in high vacuum imparts superior capacity characteristics and favorable cyclic properties to a non-aqueous electrolyte cell. The present invention has been accomplished based on those findings.

More specifically, the present invention provides a method for producing carbonaceous anode material for non-aqueous electrolyte cell, characterized in that an electron beam accelerated in high vacuum is irradiated under a gaseous atmosphere to a carbonaceous material capable of intercalating or deintercalating light metal ions.

The present invention also provides a carbonaceous anode material for non-aqueous electrolyte cell produced by the method above. The present invention furthermore provides a non-aqueous electrolyte cell consisting of an anode capable of being doped and dedoped with a light metal ion, a cathode, and a non-aqueous electrolyte, which uses the aforementioned carbonaceous anode material as the anode thereof.

DETAILED DESCRIPTION OF THE EMBODIMENTS

Figure 1:
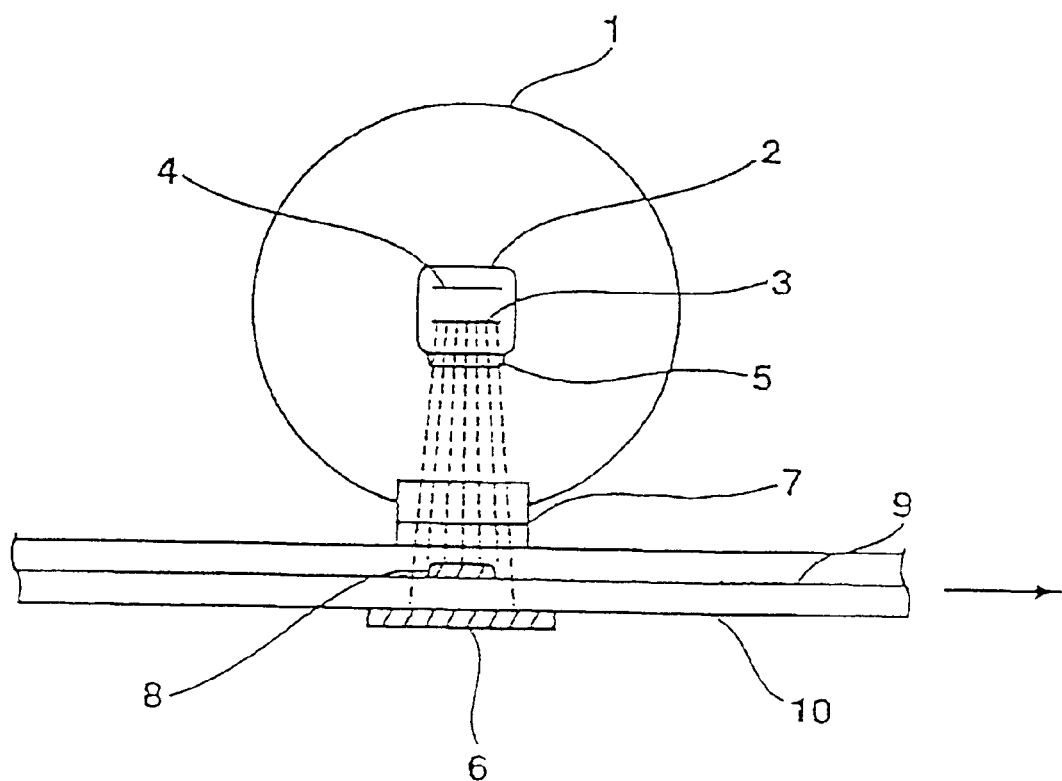
FIG. 1 is an explanatory schematic diagram showing an electron beam irradiating apparatus for use in the process according to the present invention.

The present invention is described in further detail below.

In the method for producing a carbonaceous anode material of non-aqueous electrolyte cell according to the present invention, an electron beam accelerated in high vacuum is irradiated under a gaseous atmosphere to a carbonaceous material capable of doping and dedoping with a light metal. The anode made of the carbonaceous material prepared by the method above imparts high capacity characteristics or favorable cyclic properties to the non-aqueous electrolyte cell.

The method according to the present invention comprises irradiating the electron beam in a gaseous atmosphere of argon, nitrogen, etc., under ordinary temperature and pressure, and not in high vacuum. Thus, the environment of the carbonaceous material on irradiating the electron beam need not be evacuated to achieve reduced pressure conditions, and this greatly shortens the lead time necessary for the production. Thus, the productivity can be greatly increased.

The oxygen concentration of the gaseous atmosphere is preferably controlled to be 300 ppm or lower. This considerably suppresses the production of oxygen radicals, and avoids the generation of oxygen-containing functional groups on the surface of the carbonaceous anode material. Such oxygen-containing functional groups are not preferred because they negatively influence the cyclic properties of the non-aqueous electrolyte cell.

Any type of carbonaceous material can be used without any limitations on irradiating an electron beam so long as it is capable of intercalating or deintercalating a light metal, but preferred are graphite and non-graphitizable carbon material.

Specific examples of graphite include mesophase carbon microbead (MCMB) which undergoes liquid crystal state in the process for forming a carbon precursor from an aromatic compound, and those obtained by calcining pitch coke at a temperature of 2,600° C. or higher. When electron beam is irradiated to MCMB-originated graphite, in particular, not only the initial discharge capacity, but also the discharge capacity after repeated recharging can be increased. In case electron beam is irradiated to graphite originating from pitch coke, the capacity retentability in cyclic recharging can be improved.

Considering the relation between the Raman spectrum characteristics and the recharging capacity, it is preferred to select graphite materials which exhibit an increase in the area ratio of the peak at 1350 cm$^{-1}$ to that at 1580 cm$^{-1}$ after the irradiation of electron beam. A graphite material which exhibits such Raman spectrum characteristics increases the recharging capacity by irradiating an electron beam, thereby resulting in an anode with improved characteristics. Similar to those enumerated above, specific examples of such graphite materials include MCMB, which undergoes liquid crystal state in the process for forming a carbon precursor from an aromatic compound, and those obtained by calcining pitch coke at a temperature of 2,600° C. or higher.

As non-graphitizable carbon material, favorably used is a material which maintains, even after calcining the material at a temperature as high as 2,600° C. or higher, a $d_{002}$-spacing observed by X-ray diffraction at a value greater than 3.4 Å. Such materials can be obtained, for instance, by calcining furfuryl alcohol resin or phenolic resin, as well as by calcining cellulose materials such as coffee beans or coconut shell, etc., in the temperature range of from 1,000 to 1,200° C. In particular, non-graphitizable carbon materials originating from furfuryl alcohol resins and cellulose based materials such as coffee beans can increase the initial discharge capacity.

The irradiation of electron beam can be performed on the powder of the carbonaceous material itself before mixing it with a binder resin and the like and molding it into the shape of the anode, or on the pelletized anode, or on a paste prepared by mixing the powder of the carbonaceous material with the binder resin and a solvent. It is preferred to irradiate electron beam to the final product shaped into an anode.

FIG. 1 shows an explanatory schematic view of the electron irradiating apparatus (for instance, Model CB250/15/180L manufactured by Iwasaki Electric Co., Ltd.) for use in the production method according to the present invention. Referring to FIG. 1, the apparatus comprises a vacuum chamber 1 equipped with an internal terminal 2. The terminal 2 is further equipped with a filament 3, a repeller 4, and a grid 5. A beam collector 6 is provided on the outside of the vacuum chamber 1. A part of the outer wall of the vacuum chamber 1 is made of a material capable of transmitting electron beam such as a titanium foil 7, so that the electron beam can be emitted outward from the vacuum chamber 1. A conveyor 9 is provided between the titanium foil 7 and the beam collector 6 to transport the specimen (carbonaceous anode material) 8 which is subjected to electron beam irradiation. A shield tube 10 is also provided between the foil 7 and the beam collector 6 to maintain the inner gaseous atmosphere at ordinary temperature and pressure.

In case of carrying out the production according to the method of the present invention by using the apparatus illustrated in FIG. 1, the inner pressure of the vacuum chamber 1 is reduced as such that it may fall in a range of from $10^{-3}$ to $10^{-5}$ Pa (equivalent to $10^{-5}$ to $10^{-7}$ Torr); then, hot electrons accelerated by applying a voltage in a range of, generally, from 100 to 300 kV, are irradiated from the filament 3 to the beam collector 6. A part of the electron beam penetrates the titanium foil 7 and enters into the shield tube 10. At the same time, the carbonaceous anode material 8 to be irradiated by the electron beam is transported under gaseous nitrogen or gaseous argon under ordinary temperature and pressure. Thus, the carbonaceous anode material 8 is irradiated with the electron beam that has penetrated the titanium foil 7. It is preferred that the carbonaceous anode material 8 once irradiated with the electron beam on the surface is turned over, so that the back side thereof can be similarly irradiated by the electron beam.

If the irradiation dose (E) of electron beam is too low, the expected effect of the present invention cannot be attained. Hence, electron beam is preferably irradiated at least at a dose of 5 kGy or higher, preferably 100 kGy or higher, and more preferably 1,000 kGy or higher, though depending on the type of the carbonaceous material. However, too high a dose tends to impair the cyclic properties of the material. Accordingly, it is also preferred that the dose is controlled to be in a range of 3,000 kGy or lower.

In case the carbonaceous material to be irradiated by electron beam is a non-graphitizable carbon material originating from furfuryl alcohol resins or cellulose based materials calcined in the temperature range of from 1,000 to 1,200° C., the irradiation dose (E) of electron beam is preferably suppressed to prevent the discharge capacity from decreasing, such that the dose may not exceed 1,000 kGy.

The irradiation dose (E) of electron beam can be expressed by the following equation (1):

$$E = nk(I/v) \quad (1)$$

where n is the repetition times of irradiating the electron beam, k is a constant depending on the electron irradiating apparatus (k=110 kGy.m/mA.min for the apparatus shown in FIG. 1), I is the current flowing between the filament 3 and the beam collector 6, and v is the velocity of the conveyor 9.

The electron beam is accelerated by applying a voltage depending on the type of the carbonaceous material to be irradiated, the irradiation dose, etc. However, if the accelerating voltage is too high, the capacity retentability tends to be impaired. Thus, when graphite is selected for the carbonaceous material, the accelerating voltage is preferably 200 kV or lower, and more preferably, about 150 kV. When non-graphitizable carbon material is used for the carbonaceous material, the accelerating voltage should be 250 kV or lower, and is preferably, 200 kV or lower.

The anode material obtained by the method for producing anode material for non-aqueous electrolyte cell described above can be used for the anode of a non-aqueous electrolyte cell by following an ordinary method. In such a case, the carbonaceous anode material must be doped with the ions of a light metal. Lithium ions are preferred as the light metal ions from the viewpoint of power output and energy density.

Anodes can be produced from the carbonaceous anode material according to the present invention by employing an ordinary process. For instance, the carbonaceous material is uniformly mixed with a binder resin, compression molded into a desired shape (for example, into pellets), and then subjected to electron beam irradiation. Otherwise, a paste is prepared by mixing the carbonaceous material with a binder resin and a solvent for dissolving the binder resin. The resulting paste is applied to an anode collector (e.g., a copper foil), and the electron beam is irradiated thereto to obtain an anode for a coil type electrode.

Other usable anodes include those obtained by uniformly mixing a carbonaceous material previously subjected to electron beam irradiation with a binder resin, and molding the resulting mixture into a desired shape (such as a pellet or a coated type product).

As binder resins and solvents usable for the production of an anode for use in non-aqueous electrolyte cell, usable are those conventionally used as binder resins and solvents. Preferably used are poly(vinylidene fluoride) (PVdF), poly (tetrafluoroethylene) (PTFE), etc.

Solvents for dissolving the binder resin for use in the present invention include various types of polar solvents capable of dissolving fluorine-based binder resin described above, for instance, dimethylformamide, dimethylacetamide, methylformamide, or N-methylpyrrolidone. In particular, N-methylpyrrolidone can be used favorably in case PVDF is used as the fluorine-based binder resin.

The ratio of mixing the carbonaceous material and the binder resin can be determined properly depending on the shape and the like of the anode.

The explanation above is for an anode capable of being doped and dedoped with light metal ions. Thus, a non-aqueous electrolyte cell can be implemented by combining the anode above with a cathode and a non-aqueous electrolyte.

Though depending on the type of the targeted battery, the cathode for use in the present invention may be those using a light metal, such as metallic lithium, as it is, and alsousable are those incorporating a metal oxide, a metal sulfide, or a polymer, etc., as the activating material. In case of constituting a lithium-ion non-aqueous electrolyte cell, for instance, a metal sulfide or a metal oxide free of lithium, such as $TiS_2$, $MoS_2$, $NbSe_2$, or $V_2O_5$, can be used as a cathode-activating substance. Particularly preferred is to use a lithium complex oxide expressed by the following formula (i):

$$Li_xMO_2 \quad (I)$$

where M represents a transition metal, which is preferably at least one selected from the group consisting of Co, Ni, and Mn; and x is a value which satisfies $0.05 \leq x \leq 1.10$. In the formula, the value for x changes in the range of $0.05 \leq x \leq 1.10$ depending on the charged or discharged state. Specific examples of compounds expressed by formula (I) include $LiCoO_2$, $LiNiO_2$ and $LiNi_yCo_{(1-y)}O_2$ (where 0<y<1). In case M represents Mn, $Li_xMn_2O_4$ and $Li_xO_2$ can be used.

The lithium complex oxides above can be produced by using the salts of lithium and the salts of transition metal M as the starting materials. For example, usable are carbonates, nitrates, sulfates, oxides, hydroxides, halides, etc. of metals. Thus, a lithium complex oxide can be produced, for instance, by first weighing the lithium salt and the salt of the starting transition metal M for the starting materials, and after thoroughly mixing them, heating and firing them under an oxygen-containing atmosphere in the temperature range of from 600 to 1,000° C. The mixing method for the components is not particularly limited; thus, the salts obtained in the form of powders may be mixed as they are in dry state, or they may be dissolved in water and mixed in the form of aqueous solutions thereof.

The cathode can be produced by following an ordinary method and using a powder of the cathode activating substance, a known binder resin (such as PVdF), and an electrically conductive material (such as graphite).

Non-aqueous electrolytes which have been employed in the conventional non-aqueous electrolyte cell, such as lithium-ion non-aqueous electrolyte cell, can be used similarly in the method of the present invention.

Non-aqueous solvents for use in the non-aqueous electrolyte include, for example, high permittivity solvents such as cyclic carbonates, e.g., propylene carbonate, ethylene carbonate, butylene carbonate, and γ-butyrolactone; or low permittivity solvents such as chain carbonates, e.g., 1,2-dimethoxyethane, 2-methyltetrahydrofuran, dimethyl carbonate, methyl ethyl carbonate, and diethyl carbonate. To improve the low temperature performance of the cell, it is further preferred to mix a high permittivity solvent with a low viscosity solvent. Particularly preferred is a mixed solvent comprising a combination of ethylene carbonate or propylene carbonate with dimethyl carbonate or diethyl carbonate. Other usable non-aqueous solvents include tetrahydrofuran, 1,3-dioxolane, sulfolane, 3-methylsulfolane, t-butyl ether, isobutyl ether, 1,2-ethoxymethoxyethane, esters of acetic acid, esters of propionic acid, methyl diglime, methyl tetraglime, ethyl glime, ethyl diglime, etc.

Conventionally employed supporting electrolytes can be used and dissolved into the non-aqueous solvents above. For example, lithium salt electrolytes include $LiClO_4$, $LiAsF_6$, $LiPF_6$, $LiBF_4$, LiCl, LiBr, $CH_3SO_3Li$, $CF_3SO_3Li$, etc. These can be used either alone or as a mixture of two or more selected therefrom.

For the other constitutions of non-aqueous electrolyte cells, such as the separators, cell casing, and cell shapes, those similar to the conventional constitutions can be employed.

Concerning the production of the non-aqueous electrolyte cell according to the present invention, a process similar to those used in the conventional lithium-ion non-aqueous electrolyte cell can beemployed, except for forming the anode from the carbonaceous anode material for non-aqueous electrolyte cell according to the present invention.

The present invention is described in further detail by referring to Examples and Comparative Examples below.

EXAMPLE 1 AND COMPARATIVE EXAMPLE 1

Preparation of Anode

Ninety parts by weight of artificial graphite obtained by calcining MCMBs at 2,800° C. and 10 parts by weight of PVdF were sufficiently mixed and dispersed in dimethylformamide (DMF), and the solvent (DMF) was vaporized under reduced pressure. The thus obtained dry product was size-reduced, and was classified to obtain particles 100 μm or less in size. The resulting classified dry product was weighed to obtain a 35-mg weight portion, which was pressure welded on a stainless steel collector 2 cm² in area by applying a pressure of 4 t/cm². Thus was obtained a pellet-like anode about 0.2 mm in thickness.

Then, electron beam was irradiated to both surfaces of the thus obtained pellet-like anode by operating the electron irradiating apparatus (Model CB250/15/180L manufactured by Iwasaki Electric Co., Ltd.) shown in FIG. 1 under the conditions shown in Table 1.

TABLE 1

| Accelerating voltage | 150 kV |
|---|---|
| Irradiation dose | 100 kGy (in equation (1), I = 10 mA, v = 11 m.min, and n = 1) |
| | 300 kGy (in equation (1), I = 10 mA, v = 11 m.min, and n = 3) |
| | 1,000 kGy (in equation (1), I = 20 mA, v = 11 m.min, and n = 5) |

In case of a carbonaceous material having a specific gravity in a range of from 1.4 to 2.3, the penetration depth of the electron beam is 0.1 mm from the surface. Since electron beam irradiation is performed in this Example from both sides of the anode having a thickness of 0.2 mm, assumably, the electron beam can penetrate over the entire area of the anode.

Preparation of Non-Aqueous Electrolyte Cell

A coin-type test cell for Example 1 was prepared by using the anode obtained above in combination with a metallic lithium counter electrode, and a non-aqueous electrolyte obtained by dissolving 1 mol/l of $LiPF_6$ in a 1:1 (by volume ) mixture of ethylene carbonate and dimethyl carbonate.

Furthermore, a test cell for Comparative Example 1 was prepared by following the same procedure for Example 1, except for not performing electron beam irradiation.

Evaluation

Recharging of test cells were performed at a constant current flow of 0.5 mA (i.e., at a current density of 0.27 mA/Cm²) (constant current recharging).

Charging of the carbonaceous electrode (corresponding to discharging for the test cell) was completed when the closed circuit voltage (CCV) of the carbonaceous anode with respect to metallic lithium counter electrode achieved −20 mV by taking polarization into consideration. Discharging of the carbonaceous electrode (corresponding to charging for the test cell) was completed when the CCV exceeded a value of 2.5 V. Charging or discharging capacity was obtained by dividing the electricity supplied with the charging or discharging by the weight of carbon present in the anode.

Table 2 shows the thus obtained charging and discharging capacity for each irradiation dose in performing initial recharging cycle.

TABLE 2

| | Irradiation dose (kGy) | Initial charging capacity (mAh/g) | Initial discharging capacity (mAh/g) | Initial current efficiency (%) |
|---|---|---|---|---|
| Example 1 | 100 | 291 | 271 | 93 |
| | 300 | 297 | 276 | 93 |
| | 1,000 | 304 | 280 | 92 |
| Comparative Example 1 | Non-irradiated | 284 | 258 | 91 |

Table 2 reads that the electron beam irradiation at a dose of 100 kGy or higher increases the initial discharge capacity by about 10 to 20 mAh/g as compared with Comparative Example 1 (Conventional method). It also reads that the initial discharge capacity increases with increasing irradiation dose from 100 kGy to 1,000 kGy.

Figure 2:
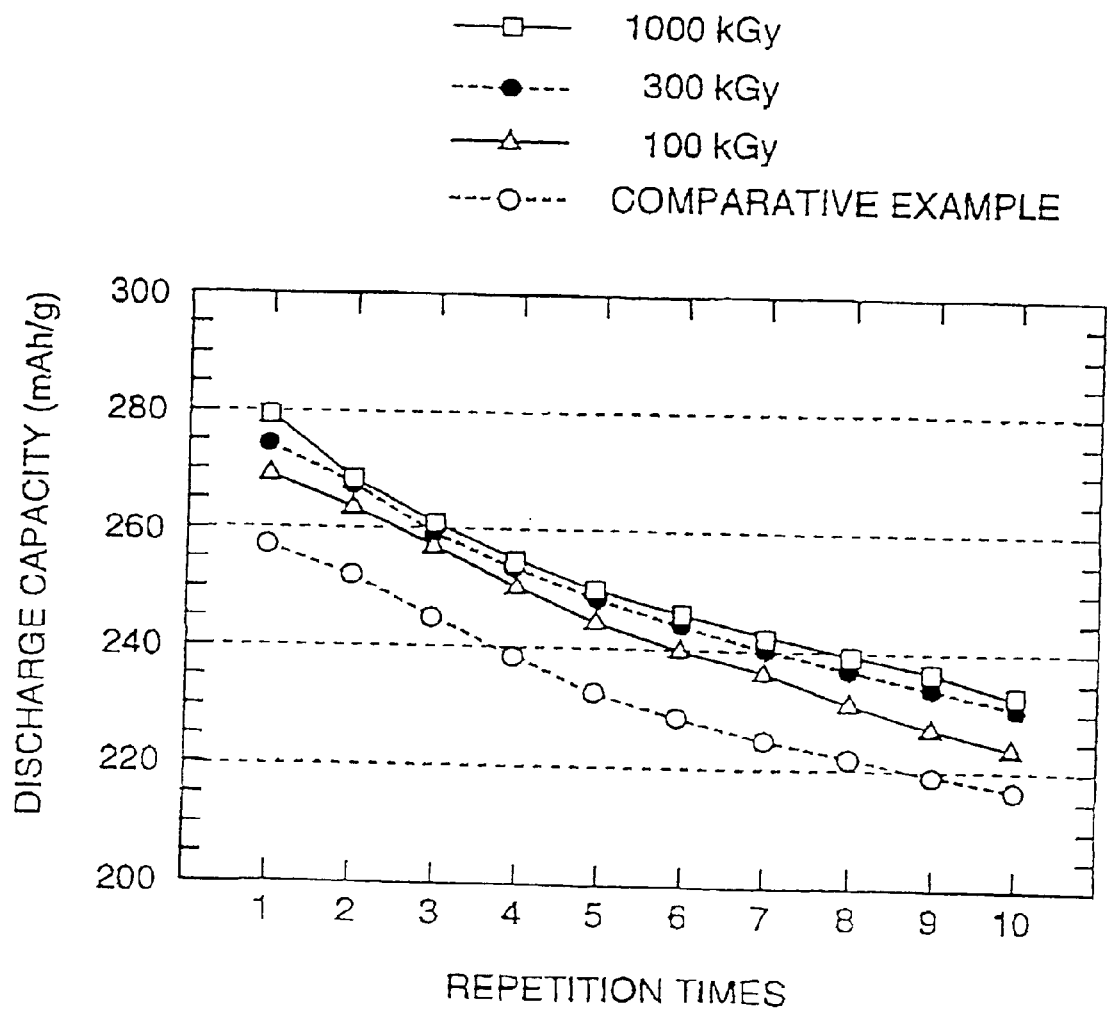
FIG. 2 shows the discharge characteristics with repeated recharging of test cells obtained in Example 1 and Comparative Example 1.

Referring to FIG. 2, it can be seen that, in at least 10 times of repeated recharging, the irradiation of electron beam maintains the charging and discharging capacity at a level higher by about 10 to 20 mAh/g with respect to the value obtained for Comparative Example 1.

Conclusively, a non-aqueous electrolyte cell improved in recharging characteristics can be implemented by employing an anode using the carbonaceous anode material obtained by irradiating electron beam to artificial graphite prepared from calcined MCMBs.

EXAMPLE 2 AND COMPARATIVE EXAMPLE 2

Test cell for Example 2 was prepared by following the same procedure described in Example 1, except for using artificial graphite obtained by calcining pitch coke at a temperature of 2,800° C. in the place of artificial graphite prepared by calcining MCMBs at 2,800° C., and for employing an electron beam irradiation dose of only 100 kGy. Furthermore, test cell for Comparative Example 2 was prepared in the same manner as in Example 2, except for performing no electron beam irradiation thereon.

The initial charging and discharging capacity were measured in the same manner as in Example 1. The results are given in Table 3. The capacity retentability (where the initial discharge capacity is taken as 100%) was obtained by cyclic recharging. The results are shown in FIG. 3.

Figure 3:
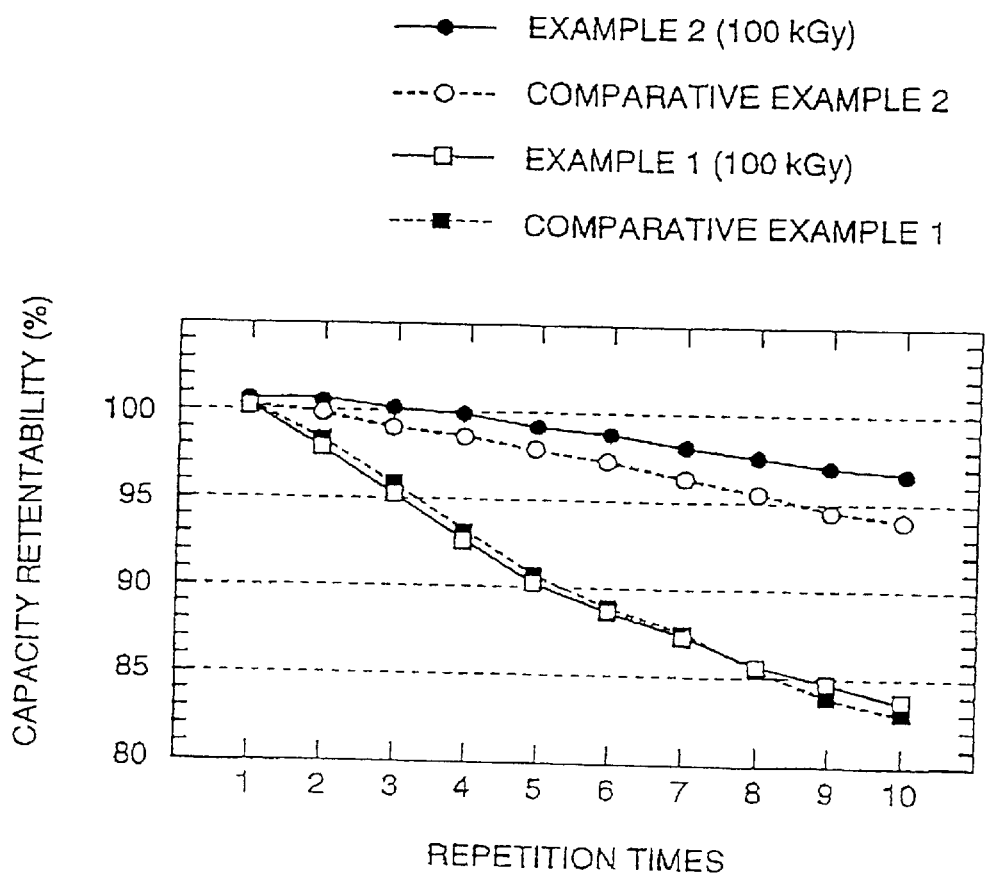
FIG. 3 shows the capacity retentability characteristics with repeated recharging of test cells obtained in Examples 1 and 2 as well as in Comparative Examples 1 and 2.

Furthermore, the capacity retentability for the test cell obtained in Example 1 and Comparative Example 1 is also shown in FIG. 3.

TABLE 3

| | Irradiation dose (kGy) | Initial charging capacity (mAh/g) | Initial discharging capacity (mAh/g) | Initial current efficiency (%) |
|---|---|---|---|---|
| Example 2 | 100 | 388 | 275 | 71 |
| Comparative Example 2 | Non-irradiated | 400 | 279 | 70 |

Table 3 reads that the test cell obtained in Example 2 shows no superiority with respect to the test cell obtained in Comparative Example 2. However, as is shown in FIG. 3, the capacity retentability (cyclic properties) with repeated recharging of the test cell obtained in Example 2 is superior to that obtained in Comparative Example 2. Furthermore, it is understood that the test cell obtained in Example 2 has far more excellent capacity retentability as compared with that of Example 1.

Conclusively, a non-aqueous electrolyte cell improved in cyclic properties can be implemented by employing an anode using the carbonaceous anode material obtained by irradiating electron beam to artificial graphite prepared from calcined pitch coke.

EXAMPLE 3 AND COMPARATIVE EXAMPLE 3

Test cell in Example 3 was prepared by following the same procedure described in Example 1, except for using non-graphitizable carbon material obtained by calcining furfuryl alcohol resin at a temperature of 1,100° C. in the place of artificial graphite prepared by calcining MCMBs at 2,800° C., a non-aqueous electrolyte obtained by dissolving 1 mol/l of $LiPF_6$ in a 1:1 by volume mixed solvent of propylene carbonate and dimethyl carbonate, and for employing an electron beam irradiation dose of only 100 kGy. Furthermore, test cell for Comparative Example 3 was prepared in the same manner as in Example 3, except for performing no electron beam irradiation thereon.

Recharging of the thus obtained test cell was performed at a constant current of 1 mA (i.e., at a current density of 0.53 $mA/cm^2$) to estimate the charging and discharging capacity. The results are given in Table 4.

The charging and discharging (at anode) capacity above was estimated by using the equilibrium potential as the standard. Thus, the results well reflect the characteristics of non-graphitizable carbon material.

Charging was performed by repeating charging for 1 hour and ceasing for 2 hours in turn. The measured voltage is plotted (not shown) against the ceasing time raised by a power of −0.5 for every time of ceasing, and the plots were extrapolated to infinite time to estimate the equilibrium potential (Intermittent recharging method).

The charging was stopped at the time the equilibrium potential reached 3 mV with respect to lithium.

Discharging was performed by repeating charging for 1 hour and ceasing for 2 hours in turn. Discharging was completed at the time the test cell voltage lowered 1.5 V in every charged state. Concerning capacity, charging or discharging capacity was obtained by dividing the electricity supplied with the charging or discharging by the weight of carbon present in the anode.

TABLE 4

| | Irradiation dose (kGy) | Charging capacity (mAh/g) | Discharging capacity (mAh/g) | Capacity loss (mAh/g) |
|---|---|---|---|---|
| Example 3 | 100 | 504 | 385 | 119 |
| Comparative Example 3 | — | 496 | 377 | 119 |

Table 4 reads that the test cell obtained in Example 3 yields both charging and discharging capacity higher than those of Comparative Example 3 by about 10 mAh/g each.

Conclusively, a non-aqueous electrolyte cell improved in recharging characteristics can be implemented by employing an anode using the carbonaceous anode material obtained by irradiating electron beam to non-graphitizable carbon material prepared from calcined furfuryl alcohol resin.

EXAMPLE 4 AND COMPARATIVE EXAMPLE 4

Test cells for Example 4 and Comparative Example 4 were prepared by following the same procedure described for Example 3 and Comparative Example 3, except for using, in the place of the non-graphitizable carbon material originated from furfuryl alcohol resin, a non-graphitizable carbon material obtained by calcining waste coffee beans as cellulose material.

Recharging processes were performed on the thus obtained test cells in the same manner as in Example 3 to measure the charging or discharging capacity. The results are given in Table 5.

TABLE 5

| | Irradiation dose (kGy) | Charging capacity (mAh/g) | Discharging capacity (mAh/g) | Capacity loss (mAh/g) |
|---|---|---|---|---|
| Example 4 | 100 | 497 | 401 | 91 |
| Comparative Example 4 | — | 456 | 346 | 110 |

Table 5 reads that the test cell obtained in Example 4 yields a charging capacity and a discharging capacity increased by about 9% and about 16%, respectively, as compared with the corresponding values for Comparative Example 4. It also reads that the capacity loss is considerably reduced by about 20%.

Conclusively, a non-aqueous electrolyte cell improved in recharging characteristics can be implemented by employing an anode using the carbonaceous anode material obtained by irradiating electron beam to non-graphitizable carbon material prepared from waste coffee beans.

EXAMPLE 5

Preparation of Anode

Ninety parts by weight of artificial graphite obtained by calcining pitch coke at 2,800° C. and 10 parts by weight of PVdF were sufficiently mixed and dispersed in DMF, and the solvent (DMF) was vaporized under reduced pressure. The thus obtained dry product was size-reduced, and was classified to obtain particles 100 μm or less in size. The resulting classified dry product was weighed to obtain a 35-mg weight portion, which was pressure welded on a stainless steel collector 2 $cm^2$ in area by applying a pressure of 4 $t/cm^2$. Thus was obtained a pellet-like anode about 0.2 mm in thickness.

Then, electron beam was irradiated to the both surfaces of the thus obtained pellet-like anode by operating the electron irradiating apparatus (Model CB250/15/180L manufactured by Iwasaki Electric Co., Ltd.) shown in FIG. 1 under the conditions shown in Table 6.

TABLE 6

| | |
|---|---|
| Accelerating voltage | 150 kV |
| Irradiation dose | 10 kGy (in equation (1), I = 1 mA, v = 11 m/min, and n = 1) |
| | 100 kGy (in equation (1), I = 10 mA, v = 11 m/min, and n = 1) |
| | 1,000 kGy (in equation (1), I = 20 mA, v = 11 m/min, and n = 5) |

In case of a carbonaceous material having a specific gravity in a range of from 1.4 to 2.3, the penetration depth of the electron beam is 0.1 mm from the surface. Because the electron beam irradiation is performed in this Example from the both sides of the anode having a thickness of 0.2 mm, assumably, the electron beam can penetrate over the entire area of the anode.

Furthermore, to study Raman spectrum characteristics of the anode, an anode for Reference Example was prepared by following the same procedure described for Example 5, except for using flaky graphite (KS-15, manufactured by Ronza Co., Ltd.) in the place of artificial graphite obtained bycalcining pitch coke at a temperature of 2,800° C.

Argon-Laser Raman Spectroscopy

Raman spectroscopy was performed on each of the anodes obtained for Example 5 and Reference Example by using Raman Spectrometer (T64000, manufactured by Jovin Yvon Corp.) utilizing an argon laser radiation (514.5 nm). The spectra thus obtained are shown in FIGS. 4 and 5.

Figure 4:
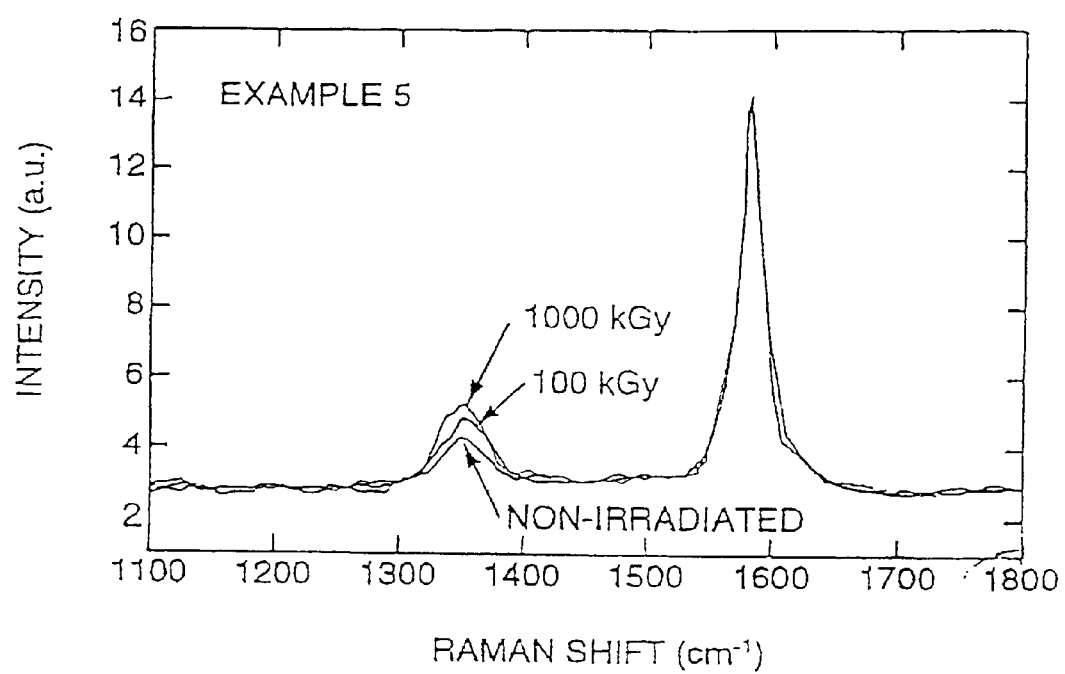
FIG. 4 shows the argon-gas laser Raman spectrum for a carbonaceous anode material obtained in Example 5.
Figure 5:
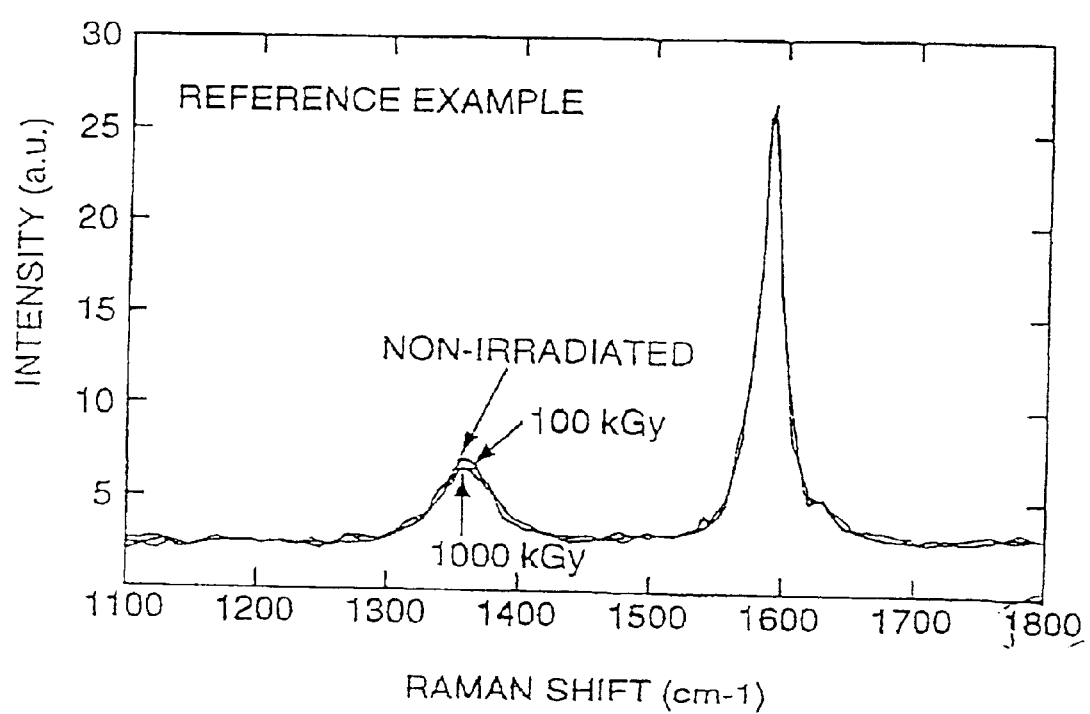
FIG. 5 shows the argon-gas laser Raman spectrum for a carbonaceous anode material obtained in Reference Example.

FIGS. 4 and 5 read that the anodes for Example 5 and Reference Example yield a peak in the vicinity of 1580 $cm^{-1}$ attributed to graphite structure and another peak in the vicinity of 1350 $cm^{-1}$ attributed to disordered layer structure of carbon. It can also be seen that the relative ratio in intensity for the peaks change with the irradiation of an electron beam, and that this change is different for the anode for Example 5 as compared with that for Reference Example.

Figure 6:
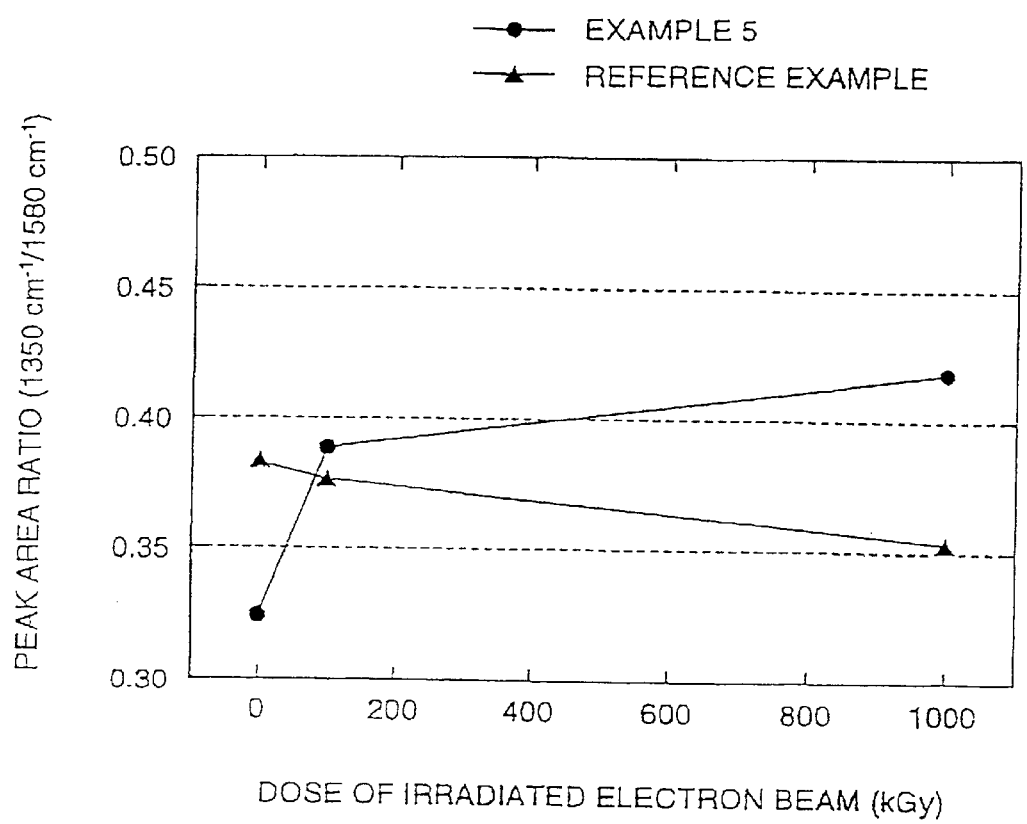
FIG. 6 shows, referring to argon-laser Raman spectra obtained for test cells of Example 5 and Reference Example, the relation between the area ratio of peak at 1350 $cm^{-1}$ to that at 1580 $cm^{-1}$ and the dose of irradiated electron beam.

FIG. 6 shows the relation between the area ratio of peak at 1350 $cm^{-1}$ to that at 1580 $cm^{-1}$ and the dose of irradiated electron beam for test cells of Example 5 and Reference Example. FIG. 6 reads that, in case of Example 5, the area ratio increases by irradiating electron beam, and that it increases with increasing dose of electron irradiation. On the contrary, the ratio decreases in Reference Example by the irradiation of electron beam, and that it further decreases with increasing dose of electron irradiation.

Preparation of Non-Aqueous Electrolyte Cell

Coin-type test cells for Example 5 and Reference Example were each prepared by using the anode obtained above in combination with a metallic lithium counter electrode, and a non-aqueous electrolyte obtained by dissolving 1 mol/l of $LiPF_6$ in a 1:1 (by volume) mixture of ethylene carbonate and dimethyl carbonate.

Evaluation

Similar to the case in Example 1, recharging of test cells were performed at a constant current flow of 0.5 mA (i.e., at a current density of 0.27 $mA/cm^2$) (constant current recharging)

Tables 7 and 8 give the thus obtained charging and discharging capacity for each irradiation dose in case of initial recharging cycle for the test cells of Example 5 and Reference Example, respectively.

TABLE 7

|  | Irradiation dose (kGy) | Initial charging capacity (mAh/g) | Initial discharging capacity (mAh/g) | Initial current efficiency (%) |
| --- | --- | --- | --- | --- |
| Example 5 | 10 | 329 | 270 | 82 |
|  | 100 | 341 | 280 | 82 |
|  | 1,000 | 343 | 285 | 83 |
|  | Non-irradiated | 330 | 271 | 82 |

TABLE 8

|  | Irradiation dose (kGy) | Initial charging capacity (mAh/g) | Initial discharging capacity (mAh/g) | Initial current efficiency (%) |
| --- | --- | --- | --- | --- |
| Reference Example | 10 | 416 | 341 | 82 |
|  | 100 | 416 | 341 | 82 |
|  | 1,000 | 385 | 320 | 83 |

TABLE 8-continued

| Irradiation dose (kGy) | Initial charging capacity (mAh/g) | Initial discharging capacity (mAh/g) | Initial current efficiency (%) |
| --- | --- | --- | --- |
| Non-irradiated | 418 | 343 | 82 |

Table 7 reads that, in case of the test cell of Example 5, the electron beam irradiation at a dose of 100 kGy or higher increases the initial discharge capacity by about 10 to 20 mAh/g as compared with that of a non-irradiated cell. It also reads that the initial discharge capacity increases with increasing irradiation dose from 100 kGy to 1,000 kGy.

Figure 7:
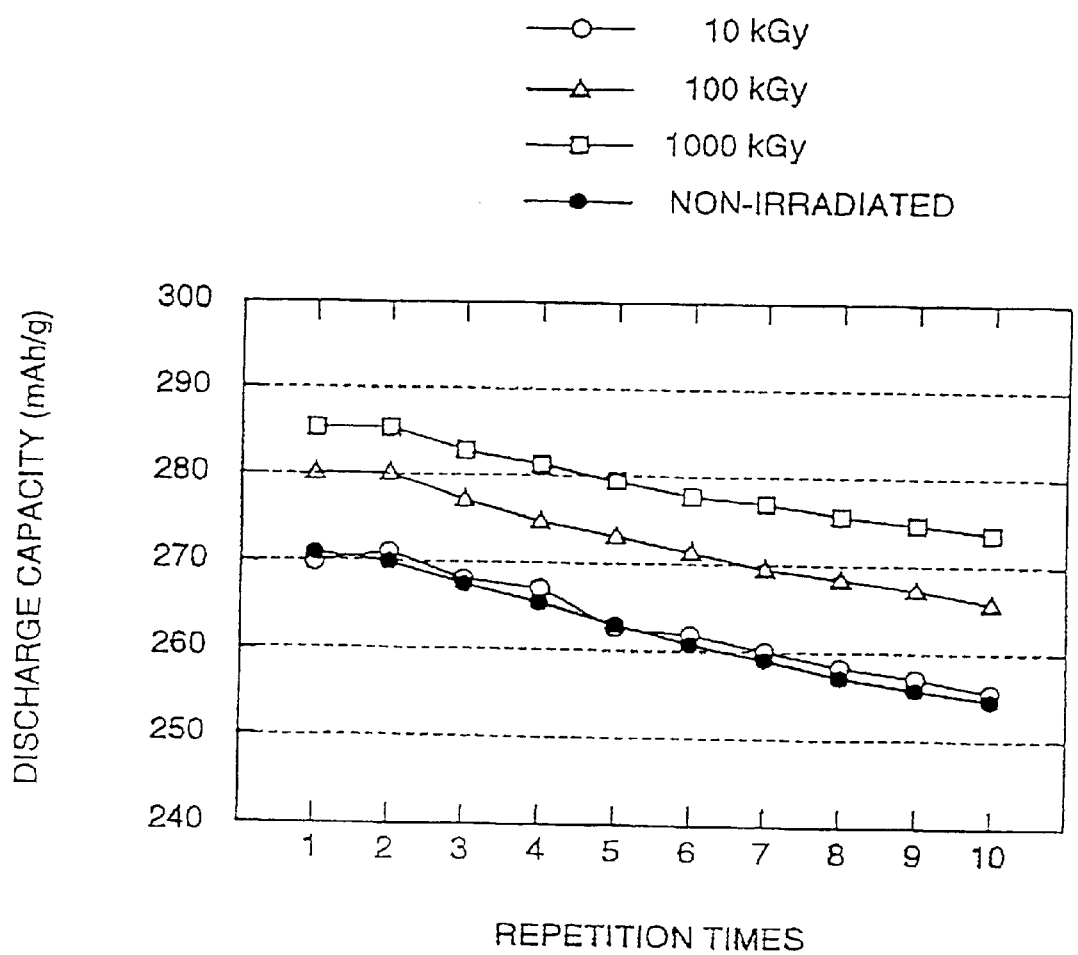
FIG. 7 shows the discharge characteristics with repeated recharging of test cells obtained in Example 5.

Referring to FIG. 7, it can be seen that, in at least 10 times of repeated recharging, the irradiation of electron beam maintains the charging and discharging capacity at a level higher by about 10 to 20 mAh/g with respect to the value obtained for the non-irradiated test cell.

On the other hand, Table 8 reads that the initial discharge capacity of the test cell of Reference Example does not increase with the irradiation of electron beam, and particularly, in case the irradiated dose is increased to 1,000 kGy, the discharge capacity is reversibly lowered.

Figure 8:
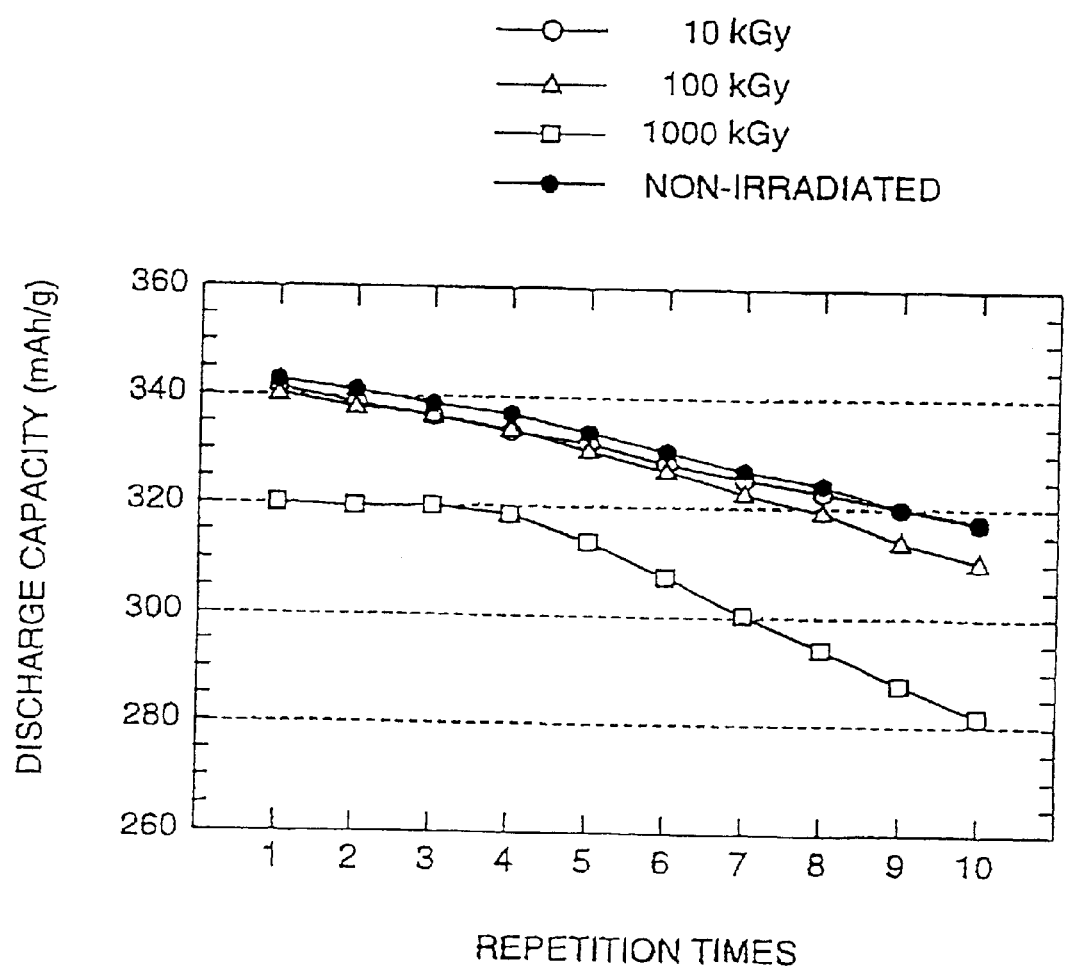
FIG. 8 shows the discharge characteristics with repeated recharging of test cells obtained in Reference Example.

Furthermore, from FIG. 8, no improvement in discharge capacity is observed in at least 10 times of repeated recharging. Particularly when electron irradiation is performed at a dose of 1,000 kGy, the low discharge capacity remains unchanged.

Conclusively, from the results obtained in Example 5 and Reference Example, a non-aqueous electrolyte cell improved in recharging characteristics can be implemented by employing an anode using the carbonaceous material obtained by irradiating electron beam to granular graphite prepared from calcined pitch coke.

Then, the results obtained on an experiment performed on cyclic properties of capacity retentability by changing the accelerating voltage of the electron beam irradiated on granular graphite prepared from calcined pitch coke are described below. The pellets of granular graphite used in the experiment were prepared in the same manner as above, and electron beam was irradiated at conditions shown in Table 9 to prepare the anodes.

TABLE 9

| Accelerating voltage (kV) | 150 | 200 | 250 |
| --- | --- | --- | --- |
| Irradiation dose (kGy) | 1,000 * | 1,000 * | 1,000 * |

*In equation (1), I = 20 mA, v = 11 m/min, and n = 5.

Because the penetration depth of electrons increases with increasing voltage, it is assumed in this experiment that the electron beam completely penetrates the entire anode by irradiating both sides of the pelletized anode.

Coin-type test cells were prepared from the thus obtained anodes in the same manner as above, and recharging processes were performed at a constant current of 0.5 mA. The capacity retentability obtained up to 10 cycles of repeated recharging is shown in FIG. 9.

Figure 9:
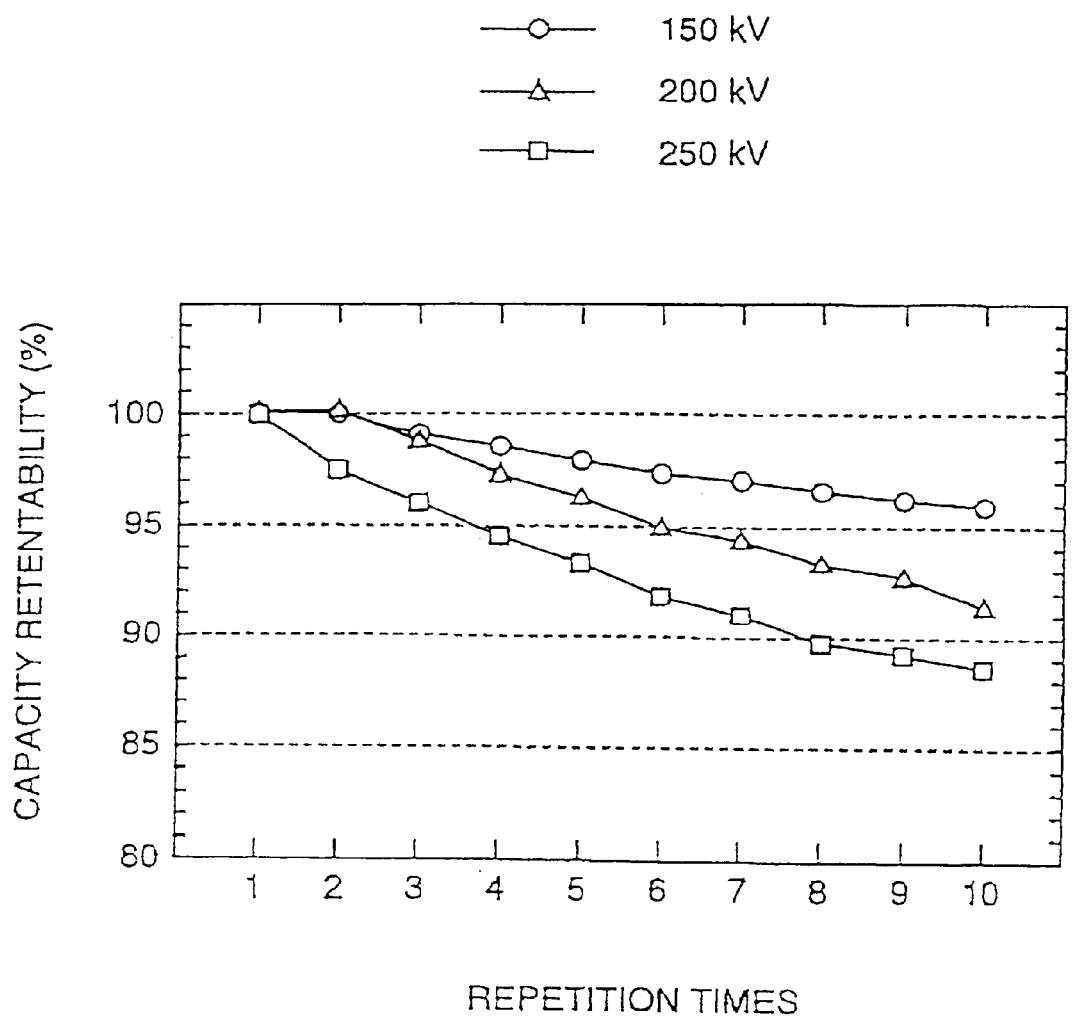
FIG. 9 shows the relation between the capacity retentability characteristics and the accelerating voltage of electron beam for test cells obtained in Example 5.

FIG. 9 reads that the capacity retentability is higher for the case electron irradiation is performed at a dose of 150 kV than the cases in which irradiation is performed at a dose of 200 kV or 250 kV. Thus, to improve the characteristics of a non-aqueous electrolyte cell using the anode containing granular graphite prepared from calcined pitch coke, the optimum accelerating voltage for the electron beam to be irradiated to the anode material is 150 kV, and not 200 or 250 kV.

EXAMPLE 6

Anodes for Example 6 were prepared by following the same procedure described in Example 5, except for using granular graphite obtained by calcining MCMBs at a temperature of 2,800° C. in the place of granular graphite prepared by calcining pitch coke at 2,800° C. Then, test cells were prepared using the resulting anodes.

Argon-Laser Raman Spectroscopy

Figure 10:
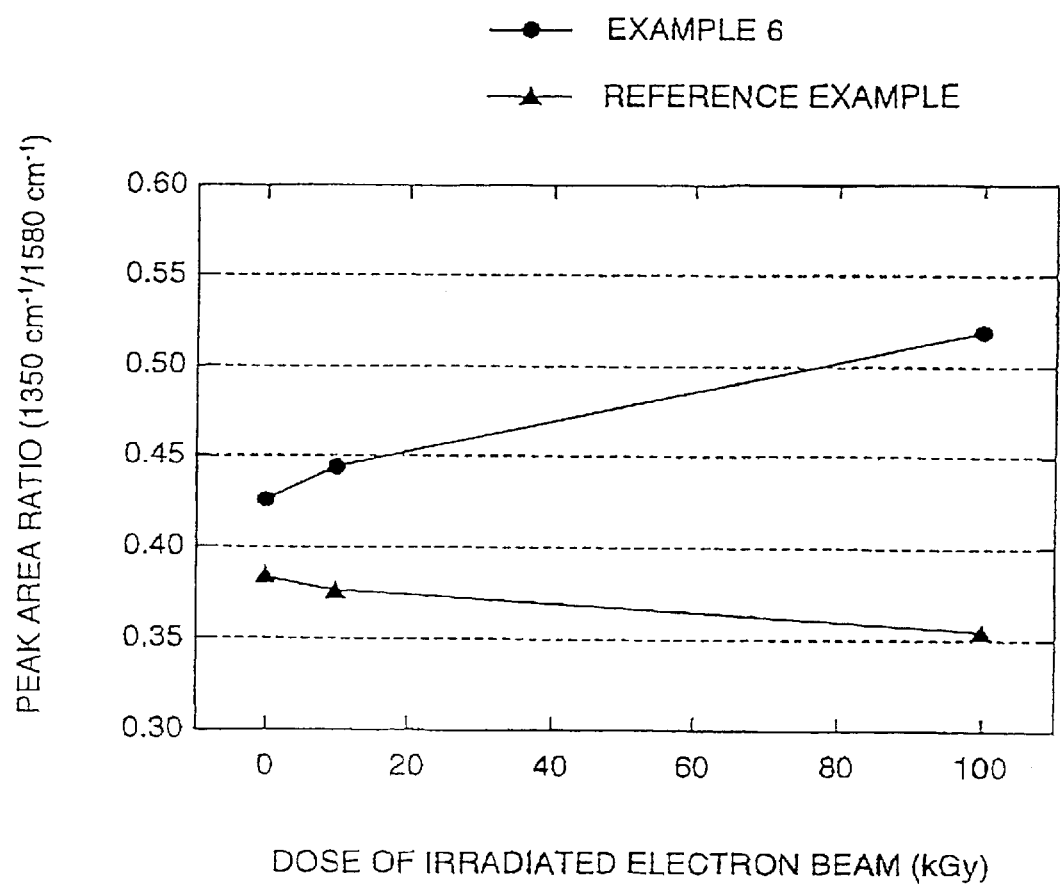
FIG. 10 shows, referring to argon-laser Raman spectra obtained for test cells of Example 6 and Reference Example, the relation between the area ratio of peak at 1350 $cm^{-1}$ to that at 1580 $cm^{-1}$ and the dose of irradiated electron beam.

Raman spectroscopy was performed on the anode obtained for Example 6 in the same manner as in Example 5. FIG. 10 shows the relation between the ratio in area for the peak at 1350 cm$^{-1}$ to that at 1580 cm$^{-1}$ and the dose of irradiated electron beam for the anode of Example 6. FIG. 10 reads that, in case of Example 6, the area ratio increases by irradiating electron beam, and that it increases with increasing dose of electron irradiation.

Evaluation

Similar to the case in Example 5, recharging of test cells were performed at a constant current flow of 0.5 mA (i.e., at a current density of 0.27 mA/cm$^2$) (constant current recharging).

Table 10 gives the thus obtained charging and discharging capacity for each irradiation dose in case of initial recharging cycle for the test cell of Example 6.

TABLE 10

| | Irradiation dose (kGy) | Initial charging capacity (mAh/g) | Initial discharging capacity (mAh/g) | Initial current efficiency (%) |
|---|---|---|---|---|
| Example 6 | 10 | 284 | 258 | 91 |
| | 100 | 293 | 270 | 92 |
| | 300 | 296 | 275 | 93 |
| | 1,000 | 301 | 280 | 93 |
| | Non-irradiated | 284 | 258 | 91 |

Figure 11:
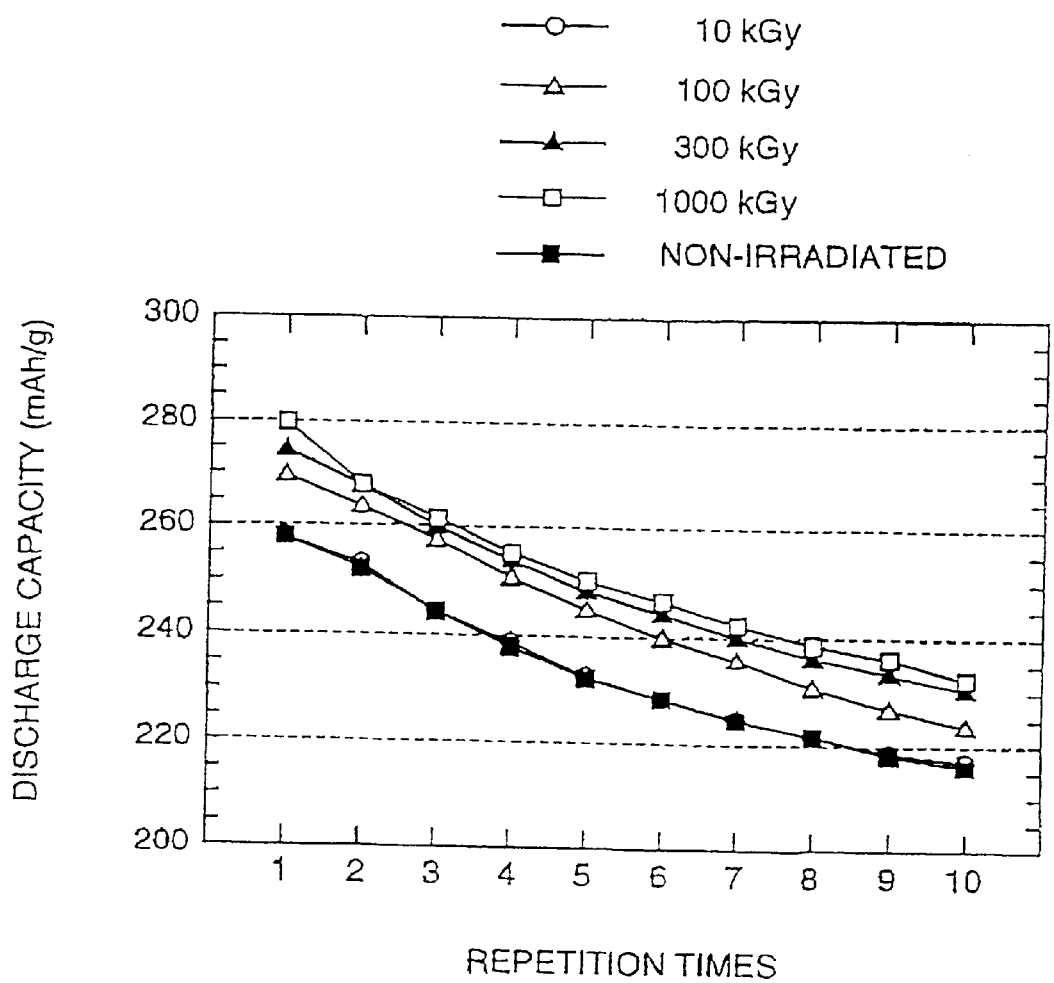
FIG. 11 shows the discharge characteristics with repeated recharging of test cells obtained in Example 6.

Table 10 reads that, in case of the test cells for Example 6, the initial discharge capacity is superior for the test cells using electron-irradiated anodes as compared with that using a non-irradiated anode. Referring to FIG. 11, the same superiority can be observed on the discharge capacity up to 10 cycles of repeated recharging cycles.

Conclusively, a non-aqueous electrolyte cell improved in cyclic properties can be implemented by employing an anode using the carbonaceous material obtained by irradiating electron beam to granular graphite prepared from calcined MCMBs.

Then, the results obtained on an experiment performed on cyclic properties of capacity retentability by changing the accelerating voltage of the electron beam irradiated on granular graphite prepared from MCMBs are described below. The pellets of granular graphite used in the experiment were prepared in the same manner as above, and electron beam was irradiated at the same conditions of Example 5 shown in Table 9 to prepare the anodes.

Coin-type test cells were prepared from the thus obtained anode in the same manner as above, and recharging processes were performed at a constant current of 0.5 mA. The capacity retentability obtained up to 10 cycles of repeated recharging is shown in FIG. 12.

Figure 12:
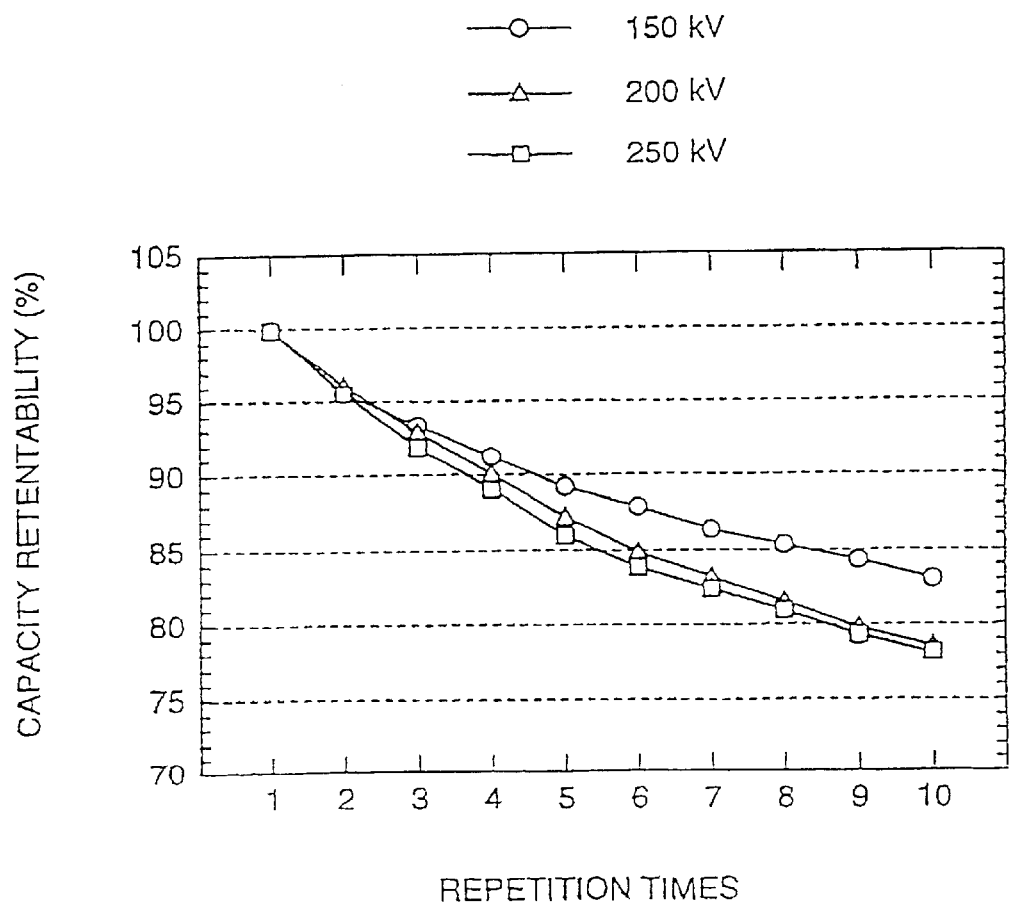
FIG. 12 shows the relation between the capacity retentability characteristics and the accelerating voltage of electron beam for test cells obtained in Example 6.

FIG. 12 reads that the capacity retentability is higher for the case electron irradiation is performed at a dose of 150 kV than the cases in which irradiation is performed at a dose of 200 kV or 250 kV. Thus, to improve the characteristics of a non-aqueous electrolyte cell using the anode containing granular graphite prepared from MCMBs, the optimum accelerating voltage for the electron beam to be irradiated to the anode material is 150 kV, and not 200 or 250 kV.

EXAMPLES 7 TO 9

Anodes for Example 7 were prepared by following the same procedure described in Example 5, except for using non-graphitizable carbon material obtained by calcining phenolic resin at a temperature of 1,100° C. in the place of granular graphite prepared by calcining pitch coke at 2,800° C. Test cells were prepared thereafter by using the resulting anodes.

Anodes for Example 8 were prepared by following the same procedure described in Example 5, except for using non-graphitizable carbon material obtained by calcining furfuryl alcohol resin at a temperature of 1,100° C. in the place of artificial graphite prepared by calcining pitch coke at 2,800° C., and for using a non-aqueous electrolyte obtained by dissolving 1 mol/l of LiPF$_6$ in a 1:1 by volume mixed solvent of propylene carbonate and dimethyl carbonate. Test cells were prepared thereafter by using the resulting anode.

Anodes for Example 9 were prepared by following the same procedure described for Example 5, except for using a non-graphitizable carbon material obtained by calcining waste coffee beans at 1,100° C. as cellulose material in the place of the granular graphite obtained by calcining pitch coke at 2,800° C. Test cells were prepared thereafter by using the resulting anodes.

In the same manner as in Example 3, each of the test cells obtained in Examples 7 to 9 was subjected to recharging under a constant current of flow of 1 mA (i.e., at a current density of 0.53 mA/cm$^2$) to obtain the discharge capacity. The results are shown in FIG. 13.

Figure 13:
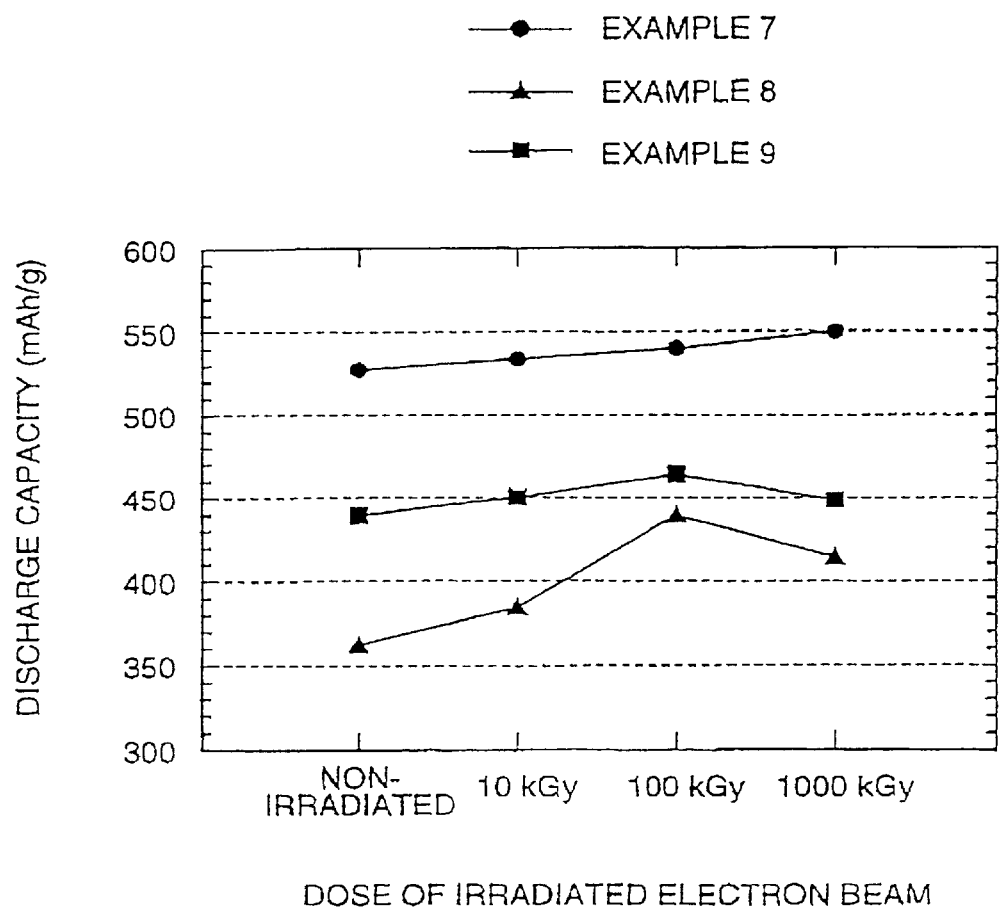
FIG. 13 shows the initial discharge characteristics of test cells obtained in Example 7, 8, and 9.

FIG. 13 reads that the discharge capacity is increased for all of the test cells of Examples 7 to 9 as compared with the corresponding non-irradiated test cells.

In the case of Examples 8 and 9, the discharge capacity tends to exhibit maximum values in case electron beam is irradiated at a dose of 100 kGy, and to slightly decrease at a dose of 1,000 kGy. Thus, in case of Examples 8 and 9, the electron beam is irradiated preferably at a dose of 1,000 kGy or lower, and more preferably, at about 100 kGy.

Conclusively, a non-aqueous electrolyte cell improved in recharging characteristics can be implemented by employing an anode using the carbonaceous material obtained by irradiating electron beam to non-graphitizable prepared from calcined phenolic resin or furfuryl alcohol, or calcined cellulose material, which was waste coffee beans in this case.

Then, the results obtained on an experiment performed on cyclic properties of capacity retentability by changing the accelerating voltage of the electron beam irradiated on non-graphitizable carbon material prepared from calcined cellulose material are described below. The pellets of non-graphitizable carbon material used in the experiment were prepared in the same manner as above, and electron beam was irradiated at conditions shown in Table 11 to prepare the anodes.

TABLE 11

| Accelerating voltage (kV) | 150 | 200 | 250 |
|---|---|---|---|
| Irradiation dose (kGy) | 100 | 100 | 100 |
| | * | * | * |

*In equation (1), I = 10 mA, v = 11 m/min, and n = 1.

Coin-type test cells were prepared from the thus obtained anodes in the same manner as above, and recharging processes were performed at a constant current of 1 mA (i.e., at a current density of 0.53 mA/cm² as in Example 3. The results are shown in FIG. 14.

Figure 14:
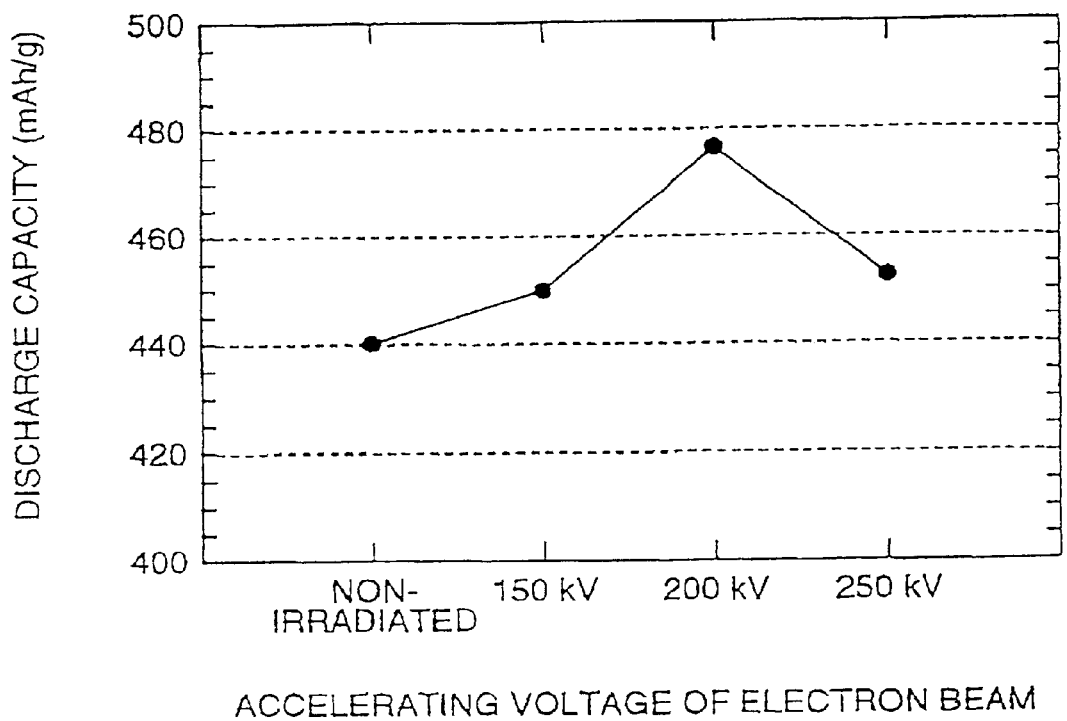
FIG. 14 shows the relation between the discharge capacity and the accelerating voltage of electron beam for test cells obtained in Example 9.

FIG. 14 reads that, as compared with the non-irradiated case, the discharge capacity is increased in all of the cases in which the irradiation of electron beam is performed at an accelerating voltage of 150 kV, 200 kV, and 250 kV. In particular, a peak is observed in the vicinity of 200 kV. Thus, when non-graphitizable carbon material prepared from cellulose carbon material is used as the anode, a non-aqueous electrolyte cell having improved characteristics can be obtained by controlling the accelerating voltage of the electron beam to, preferably, 250 kV or lower, and more preferably, in the vicinity of 200 kV.

While the invention has been described in detail by referring to specific examples and comparative examples, it should be understood that modifications can be made without departing from the scope of the present invention.

What is claimed is:

1. A non-aqueous electrolyte cell comprising:

an anode capable of intercalating or deintercalating light metal ions, the anode is made of a carbonaceous material that is subjected to electron beam irradiation at a dose ranging from 300 kGy to 1,000 kGy when an electron beam accelerated in a vacuum is irradiated under a gaseous atmosphere to the carbonaceous material, the carbonaceous material being selected from the group consisting of calcined mesophase carbon microbead, calcined pitch coke, calcined furfuryl alcohol resin, calcined cellulose and calcined phenolic resin, a cathode, and a non-aqueous electrolyte, wherein the non-aqueous electrolyte cell yields both charging and discharging capacity at a level of at least 10 mAh/g higher than a second non-aqueous electrolyte cell having a second anode not subjected to electron beam irradiation.

2. The non-aqueous electrolyte cell as claimed in claim 1, wherein the light metal ions are lithium ions.

3. A non-aqueous electrolyte cell comprising:

an anode capable of intercalating or deintercalating light metal ions, the anode is made of a carbonaceous material that is subjected to electron beam irradiation at a dose ranging from 300 kGy to 1,000 kGy when an electron beam accelerated in a vacuum is irradiated under a gaseous atmosphere to the carbonaceous material, the carbonaceous material being selected from the group consisting of calcined mesophase carbon microbead, calcined pitch coke, calcined furfuryl alcohol resin, calcined cellulose and calcined phenolic resin, a cathode, the cathode utilizes a cathode activating substance that satisfies the following formula:

$Li_xMO_2$ where M represents a transition metal, and x is a value which satisfies $0.5 \leq x \leq 1.10$ and a non-aqueous electrolyte, wherein the non-aqueous electrolyte cell yields both charging and discharging capacity at a level of at least 10 mAh/g higher than a second non-aqueous electrolyte cell having a second anode not subjected to electron beam irradiation.

4. The non-aqueous electrolyte cell as claimed in claim 3, wherein the transition metal of the cathode activating substance is at least one selected from the group consisting of Co, Ni, and Mn.

5. A non-aqueous electrolyte cell comprising:

an anode capable of intercalating or deintercalating light metal ions, the anode is made of a carbonaceous material that is subjected to electron beam irradiation at a dose ranging from 300 kGy to 1,000 kGy when an electron beam accelerated in a vacuum is irradiated under a gaseous atmosphere to the carbonaceous material, the carbonaceous material being selected from the group consisting of calcined mesophase carbon microbead, calcined pitch coke, calcined furfuryl alcohol resin, calcined cellulose and calcined phenolic resin, a cathode, and a non-aqueous electrolyte including a non-aqueous solvent, the non-aqueous solvent is a mixed solvent of a high permittivity solvent and a low permittivity solvent, wherein the non-aqueous electrolyte cell yields both charging and discharging capacity at a level of at least 10 mAh/g higher than a second non-aqueous electrolyte cell having a second anode not subject to electron beam irradiation.

6. The non-aqueous electrolyte cell as claimed in claim 5, wherein the high permittivity solvent is at least one selected from the group consisting of propylene carbonate, ethylene carbonate, butylene carbonate, and γ-butyrolactone.

7. The non-aqueous electrolyte cell as claimed in claim 5, wherein the low permittivity solvent is at least one selected from the group consisting of 1,2-dimethoxyethane, 2-methylhydrofuran, dimethyl carbonate, methyl ethyl carbonate, and diethyl carbonate.

* * * * *